United States Patent [19]

Workman

[11] Patent Number: 4,698,539
[45] Date of Patent: Oct. 6, 1987

[54] DYNAMOELECTRIC MACHINES

[76] Inventor: John Workman, Lough House, Greyabbey, Northern Ireland

[21] Appl. No.: 309,373

[22] Filed: Oct. 7, 1981

Related U.S. Application Data

[63] Continuation-in-part of Ser. No. 77,281, Sep. 20, 1979, abandoned, which is a continuation of Ser. No. 803,941, Jun. 6, 1977, abandoned.

[30] Foreign Application Priority Data

Jun. 10, 1976 [GB] United Kingdom ............... 24009/76

[51] Int. Cl.⁴ ............................................... H02K 1/00
[52] U.S. Cl. .................................... 310/216; 310/217; 310/218; 310/42
[58] Field of Search .......................... 310/42, 216–218, 310/179, 254, 259, 258, 89

[56] References Cited

U.S. PATENT DOCUMENTS

| | | |
|---|---|---|
| 1,255,606 | 2/1918 | Hensley ........................... 310/216 X |
| 1,920,354 | 8/1933 | Carpenter ........................ 310/216 X |
| 2,057,503 | 10/1936 | Sawyer .................................. 310/259 |
| 2,303,291 | 11/1942 | Moss ..................................... 310/259 |
| 4,071,788 | 1/1978 | Martin et al. ......................... 310/42 |

Primary Examiner—Donovan F. Duggan
Attorney, Agent, or Firm—Neuman, Williams, Anderson & Olson

[57] ABSTRACT

An electric motor or generator has a rotor and a stator comprising a generally cylindrical yoke having poles secured to the interior thereof. The yoke is closed by end members secured thereto, said end members mounting bearings for the rotor. The yoke consists of a continuous spirally wound coil of metal strip. The convolutions of said coil are secured so that the coil forms a monolithic structural element which mechanically interconnects the end members, without the need for additional frames or ties.

2 Claims, 10 Drawing Figures

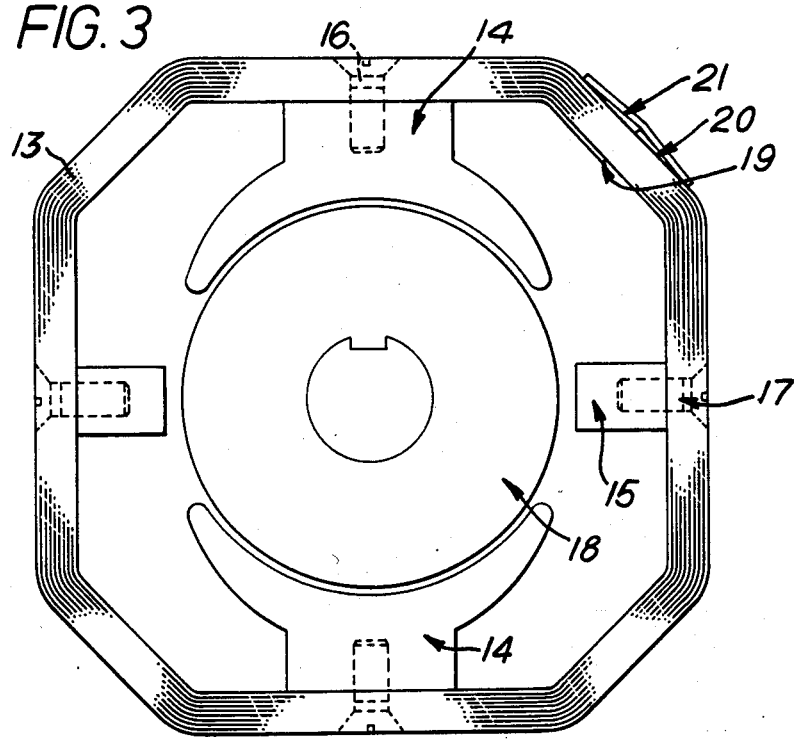
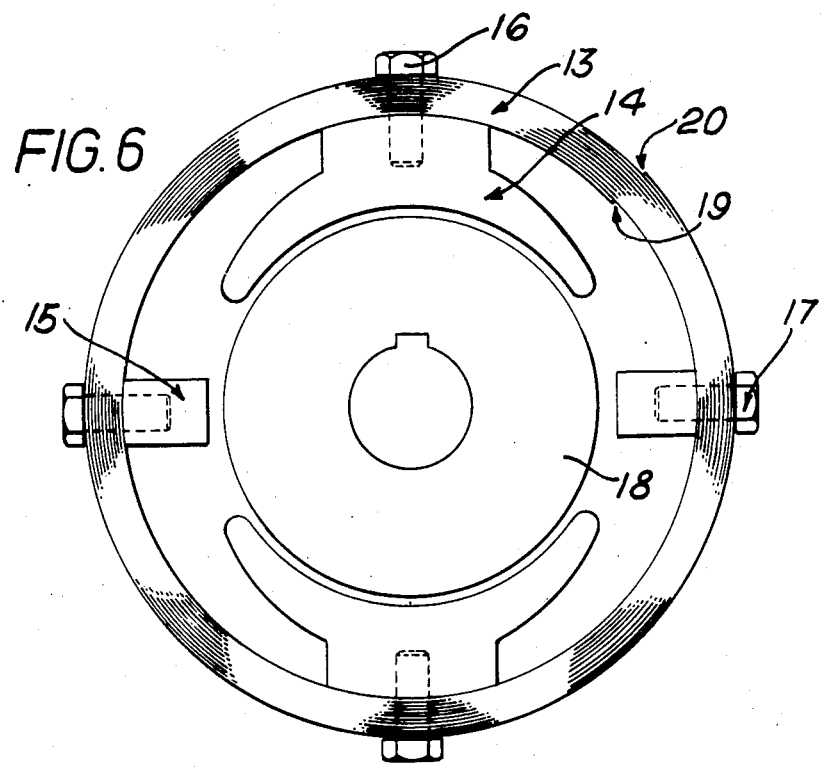

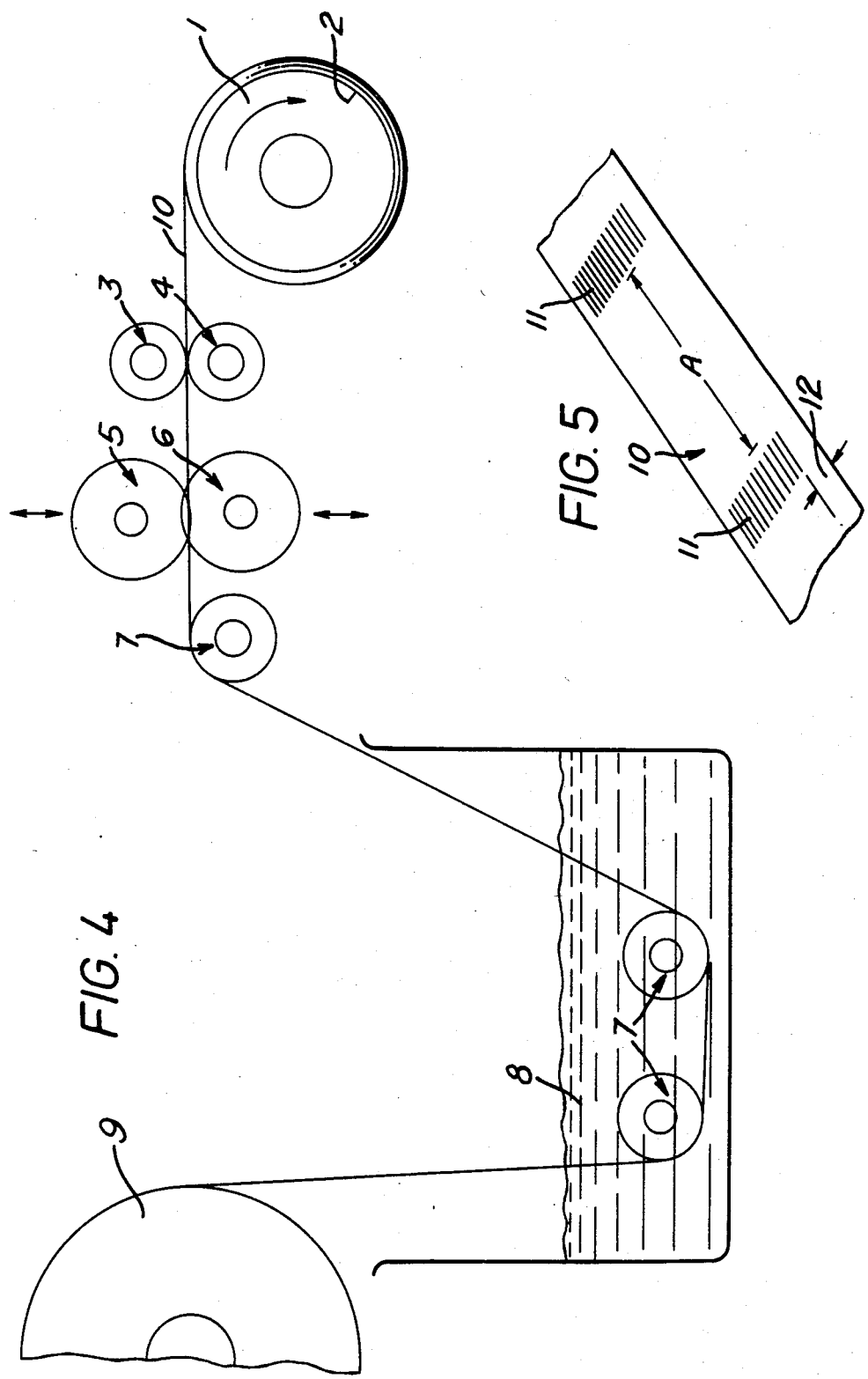

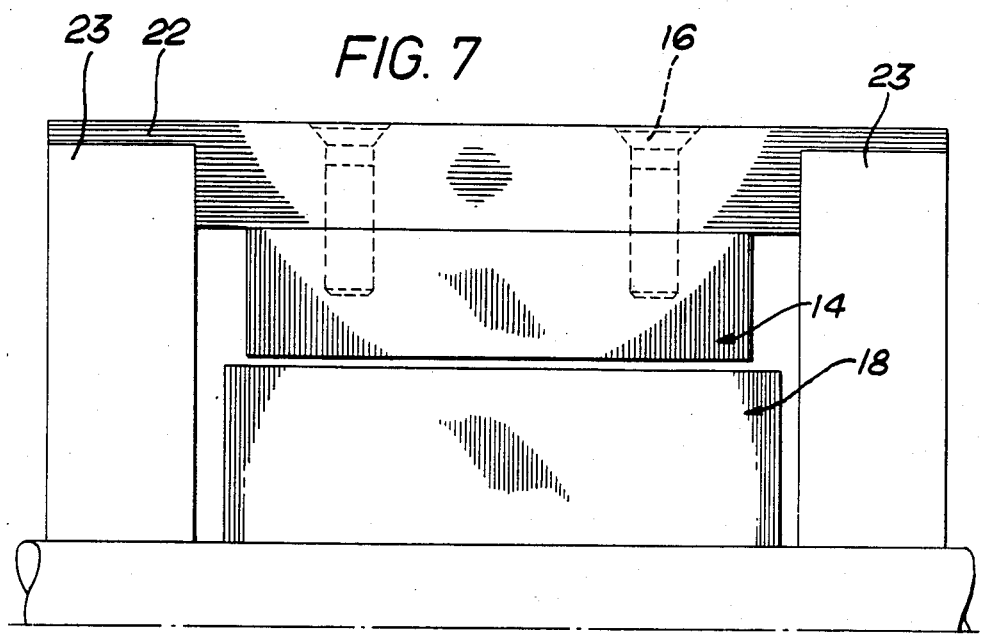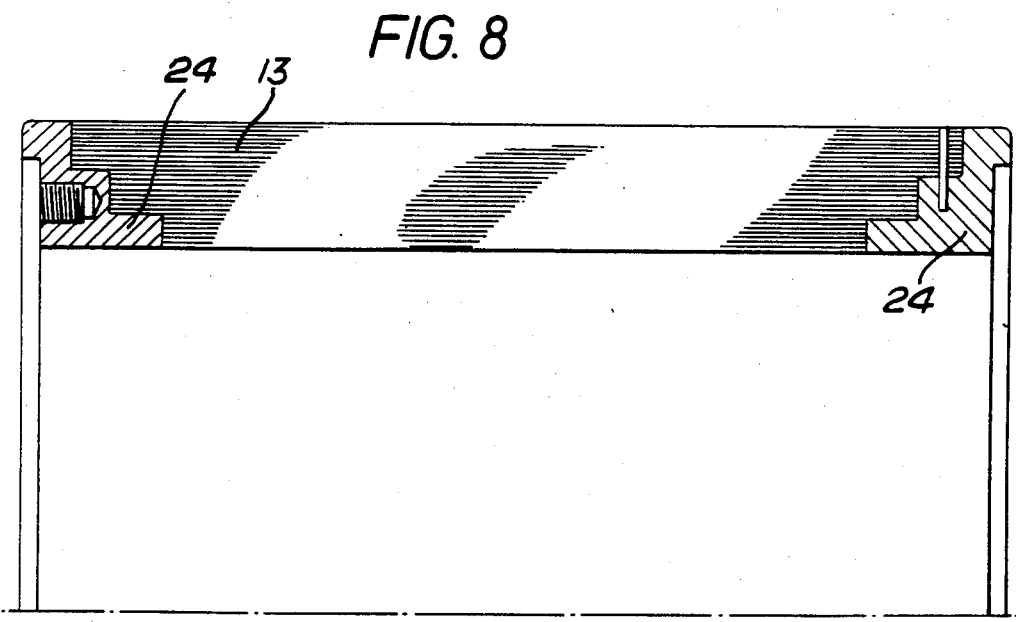

DYNAMOELECTRIC MACHINES

CROSS-REFERENCE TO RELATED APPLICATIONS

This application is a continuation-in-part of my application Ser. No. 77,281 filed Sept. 20, 1979 (now abandoned), which was a continuation of my application Ser. No. 803,941 filed June 6, 1977 (now abandoned).

BACKGROUND OF THE INVENTION

This invention relates to a pole-supporting structure in a rotating D.C. electric motor or generator (hereinafter referred to for simplicity as "D.C. motors").

It is known to construct a D.C. motor stator by bolting pole members to the interior of a solid tube of mild steel, the tube acting both as a magnetic path and as a physical pole support and housing. The tube is closed by end members which also mount bearings for the rotor. This design approach gives a motor which has a relatively small number of parts and is cheap to manufacture. It is also relatively simple to fabricate, although at least the end faces of the tube and the pole mounting points must be machined accurately to obtain accurate location of the poles relative to the rotor.

This type of motor, however, is electrically inefficient because of eddy currents induced in the tube when the D.C. supply is derived from a rectified A.C. supply.

It is also well known to mount the poles on a structure formed of laminations stacked axially of the motor and clamped together. This greatly reduces the energy losses due to eddy currents, but at the disadvantage of greatly increasing the complexity of the structure and the required amount of manufacturing work, and thus considerably increasing cost. Among other disadvantages of stacked-lamination stators are (1) the joints between adjacent laminations are exposed along the length of the machine and may attract water or other corrosive liquids, resulting in bursting apart of the lamination stack; (2) the length of the stator is substantially greater than the length of the rotor due to the presence of end frame clamping devices to hold the lamination stack together; (3) the thickness of each lamination is substantially constant and it is not possible to optimise the lamination thickness along the magnetic flux path; and (4) even with careful geometric design and layout of lamination shapes, there is unavoidably a large degree of waste in punching the laminations from sheet or strip.

One object of the present invention is therefore, in general terms, to provide a pole-supporting structure which combines the benefits of the two types of structure discussed above.

SPECIFIC PRIOR ART

It is well known to wind strip material into a coil to form a magnetic structure in such fields as magnetic memory arrays. It has hitherto been proposed to apply a similar technique to certain parts of the electric motor art.

U.S. Pat. No. 2,469,808 to Aske shows a rotor for an A.C. induction motor which includes a strip material wound into a coil. However, Aske is concerned with a "flat" motor which is an inherently low power device. The rotor coil taught by Aske is not a structural element or even self-supporting, but is structurally braced by a cup-shaped metal casing in which the coil is received.

U.S. Pat. No. 2,880,335 to Dexter also relates to a flat A.C. induction motor. Dexter shows an annulus coiled from strip and acting as a flux path for the stator field coils. Again, this coiled strip acts purely as a non-structural magnetic element, a separate frame being provided for supporting the stator elements and rotor bearing.

SUMMARY OF THE INVENTION

An object of the invention is to provide a D.C. motor stator structure which combines low manufacturing cost with good resistance to eddy current losses.

Another object of the invention is to provide a stator structure in which a hollow housing is coiled from strip material to provide both a laminated magnetic flux path and a monolithic structural member capable of directly supporting end frames mounting bearings for the rotor.

A further object of the invention is to provide a pole-supporting structure which is coiled from thin strip, requiring low working forces to produce the coil, but after coiling is a stiff monolithic structure which can be machined without requiring supporting jigs or fixtures.

According to the invention an electric motor has a rotor and a stator comprising a generally cylindrical yoke having poles secured to the interior thereof. The yoke is closed by end members secured thereto, said end members mounting bearings for the rotor. The yoke consists of a continuous spirally wound coil of metal strip. The convolutions of said coil are secured so that the coil forms a monolithic structural element which mechanically interconnects the end members, without the need for additional frames or ties.

Further objects, features and advantages of the present invention will be apparent from the following description of embodiments thereof, given by way of example with reference to the accompanying drawings.

BRIEF DESCRIPTION OF THE DRAWINGS

FIG. 3 is a diagrammatic end view of the stator structure and rotor of the motor of FIGS. 1 and 2;

FIG. 4 illustrates a method of manufacturing the motor of the invention;

FIG. 5 illustrates a portion of the strip material prior to coiling, in one form of the invention;

FIG. 6 is a view similar to FIG. 3 illustrating an alternative form of motor;

FIG. 7 is a schematic cross-section of one-half of a motor showing a modified stator end structure;

FIG. 8 is a similar view of one-half of a stator having another modified end structure.

DESCRIPTION OF PREFERRED EMBODIMENTS

Figure 1:
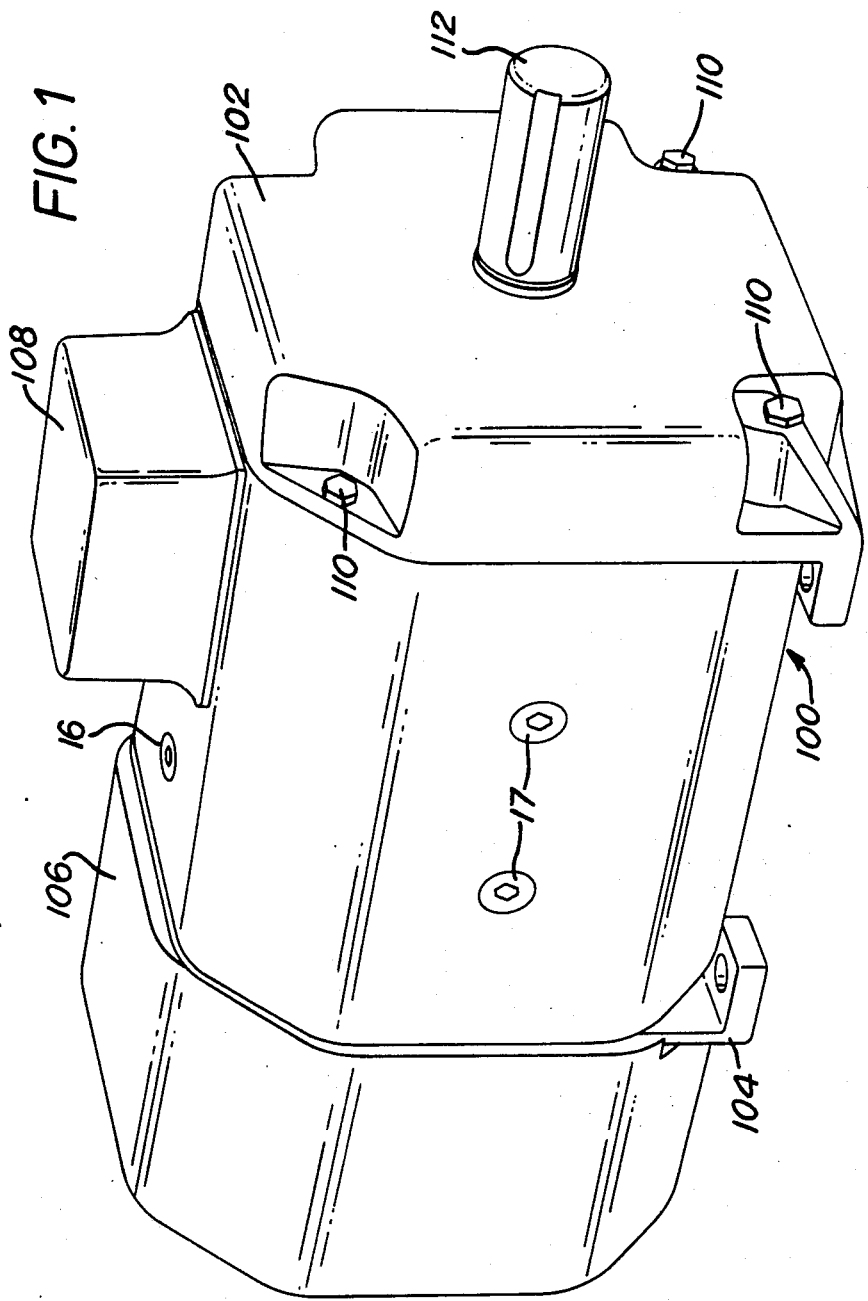
FIG. 1 is a perspective view of one form of motor embodying the invention.
Figure 2:
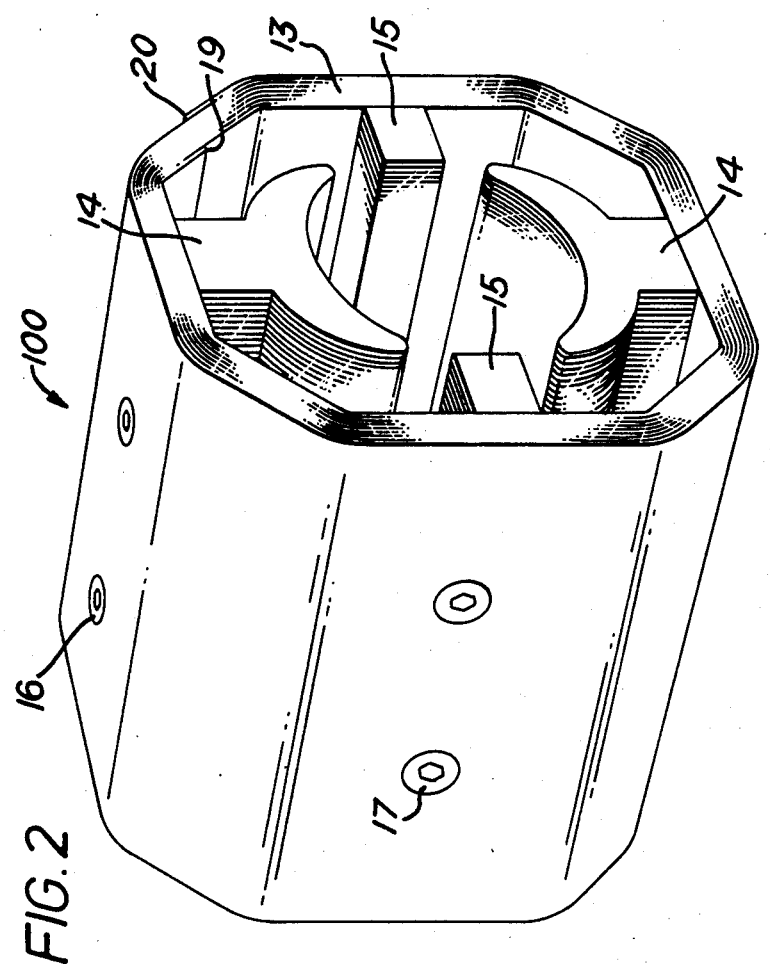
FIG. 2 is a perspective view of the pole-supporting structure of the motor of FIG. 1.

Referring to FIGS. 1 to 3, as seen in FIG. 1 a motor embodying the invention includes a main stator assembly 100 sandwiched between end members 102 and 104. The end member 102 is seen in full in FIG. 1, but the end member 104 is largely hidden by a cover 106 enclosing the commutator and brush gear. A cover 108 is removable for access to cable connections.

The end members 102, 104 are directly connected to the assembly 100, as by bolts 110, as will be discussed in greater detail below, and mount bearings (not shown) for the rotor shaft 112.

As seen in FIGS. 2 and 3, the stator assembly comprises poles 14 and antipoles 15 secured by bolts 16 to a pole-supporting structure or yoke 13. The yoke 13 in this embodiment is polygonal, having radiused or curved portions between adjacent flat portions which in this instance are of unequal dimension but the plane portions could be of equal dimensions around the circumference of the yoke 13.

The yoke 13 is formed, as will be described in greater detail hereinafter, from a single strip of magnetic material coiled on a mandrel and secured into a monolithic unit, for example by an adhesive between the turns of the coil or by welding the ends 19, 20 of the coil. I have found that the yoke formed in this way, in addition to acting as a magnetic path, can be used also as a main structural element of the motor. Also, the yoke 13 thus formed can be easily machined, for example the end faces of the yoke can be milled, drilled and tapped as easily as if the yoke were of solid metal, to provide an accurate location for the end members 102,104. It has also been found that formation of the coil on a mandrel in this manner provides accurate location for the poles and interpoles with respect to the rotor axis without machining the interior of the yoke.

Turning to FIG. 4, the formation of the yoke 13 will now be explained. The yoke is formed on a mandrel 1 which in FIG. 4 is a cylindrical mandrel for forming a cylindrical yoke; it will be readily appreciated that the polygonal yoke of FIGS. 1 through 3 would be formed on a polygonal mandrel of complementary shape. A strip 10 of magnetic material such as annealed mild steel fed from a supply roll 9 is moved by guide rollers 7 through a degreasing fluid 8, between slitting cutters 5,6 between coating applicator rollers 3,4 and is wound around the mandrel 1, the leading edge of the strip 10 being trapped in a slit 2, in the surface of the mandrel 1.

The rollers 3,4 are arranged to apply coating to the opposite sides of the strip 10. For example, one coating may be an electrical insulant while the other coating may be an adhesive material. Conveniently, the adhesive material is applied in a semi-cured state so that on subsequent heating after the yoke has been coiled on the mandrel 1 the adhesive forms a strong joint between adjacent coils of the yoke. The adhesive coating may itself be an electrical insulant.

The slitting cutters 5,6 are arranged to provide sets of adjacent slits 11 spaced by margins 12 from the edge of the strip 10 and mutually spaced by a distance A (FIG. 5) which is substantially equal to the distance along the magnetic path between adjacent poles (either main poles or interpoles) of the D.C. machine.

It is preferred that the strip 10 is made of grain-orientated steel with its axis of maximum permeability along the length of the strip and, in the coiled yoke 13 which results from this process it is preferred that the opposite ends 19,20 of the strip 10 are circumferentially adjacent in order to minimise magnetic imbalance. This is shown in FIG. 3. Conveniently, a nameplate 21 which acts as a mask for the length of the end 20 is secured to the yoke 13 (FIG. 3).

The coiled yoke 13 may be produced without the slits 11 shown in FIG. 5 but in this event the magnetic flux passing through each of the poles requires to traverse the laminations formed by coils of the yoke 13 in order to pass along the yoke 13 to the adjacent pole. Rapid changes in the pole flux may give rise to eddy currents where the flux passes through the wound laminated structure in a direction perpendicular to the plane of the laminations and for this reason it is preferred to introduce the slits 11. The slits 11 also mitigate the effects of eddy currents arising due to the D.C. supply being achieved by rectification of an A.C. supply.

The cylindrical form of motor produced by the apparatus and method of FIG. 4 is illustrated in FIG. 6 and will be readily understood by analogy with FIG. 3, like parts being denoted by like reference numerals.

The thickness of the strip 10 may be in the range 0.3 to 1 mm and the strip width should be slightly greater than the axial length of the yoke 13 to permit machining of the end faces to receive components. The end faces 22 may be stepped as shown in FIG. 7 and secured to end frames 23. It will be noted that the pole 14 is formed from a stack of plates which are bonded together and the rotor 18 is likewise formed from a stack of plates each of which stacks extends axially of the machine. FIG. 8 illustrates another form which the end face 22 may take. In this case solid reinforcing rings 24 are used (made of steel) and which are assembled with the mandrel 1 of FIG. 1 during production of the coiled yoke 13. In this case the strip 10 is edged prior to being wound onto the mandrel 1 and is secured to the rings 24 by bonding or by pin.

Figure 9:
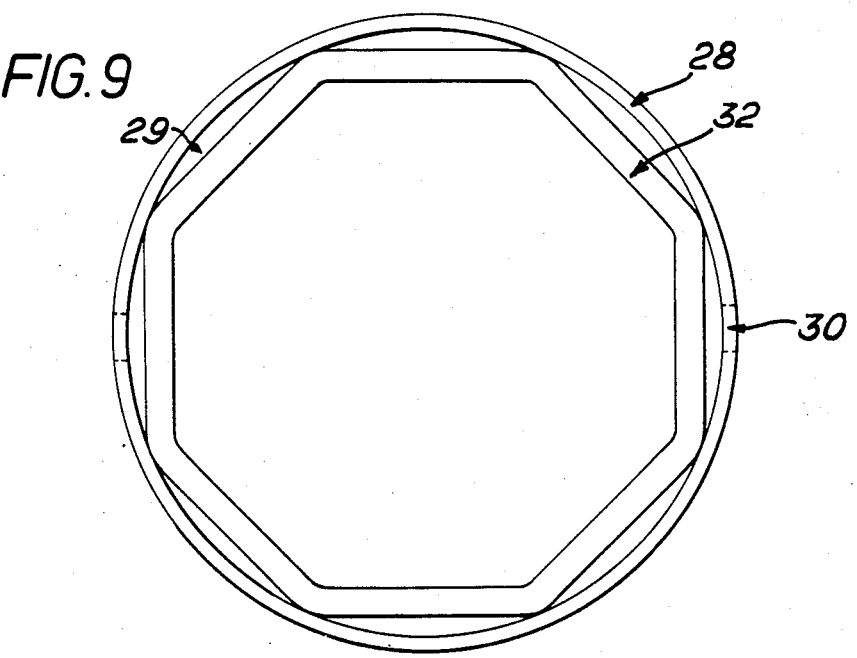
FIGS. 9 and 10 are schematic end views illustrating other forms of stator embodiment.

FIG. 9 illustrates a further form which the yoke 13 may take. In this case a coiled portion 28 of cylindrical form circumscribes a coiled portion 32 of polygonal form to provide axially extending spaces 29 along which coolant gases (such as air) may flow.

Figure 10:
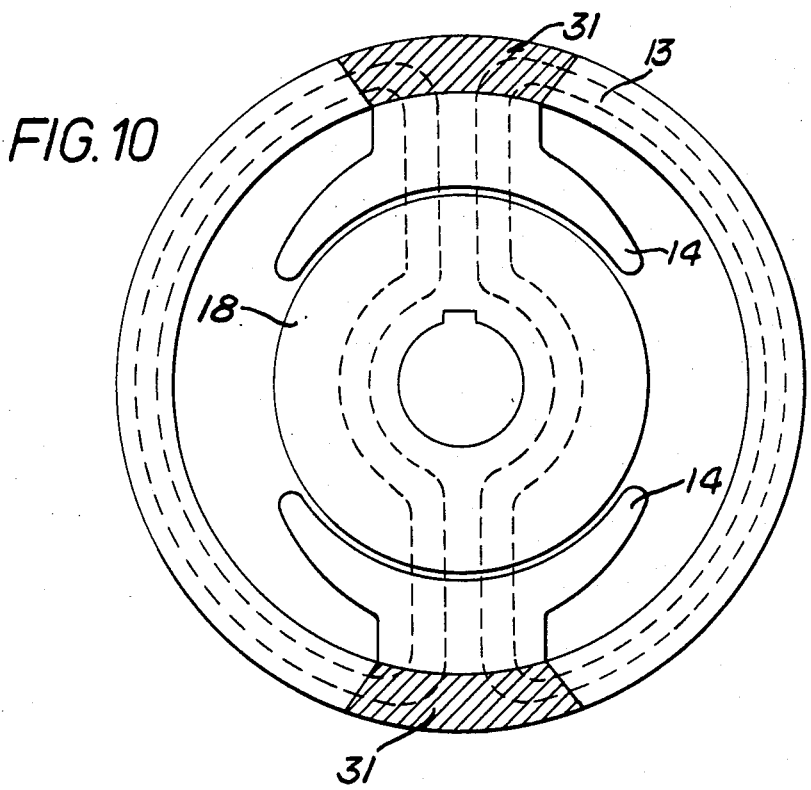

FIG. 10 illustrates a machine with two poles 14 and the yoke 13 is shaded at portions 31 adjoining the poles 14, these portions 31 incorporate the slits 11 in each turn or coil of the yoke 13. Of course the portions 31 are of most effect adjacent interpoles, where rapid flux changes are common. Thus it may be convenient to provide slit portions 31 adjacent interpoles only and to mount the main poles on an area of the yoke which is devoid of slits. The slits 11 in the completed yoke 13 may be impregnated with electrically insulating adhesive material in order to provide a block to the flow of eddy currents across such slits. The magnetic flux path is indicated and because of the extra magnetic length the radial thickness of the yoke can be minimised.

Various details in the manufacture of the yoke 13 have not been described in detail but are shown in the drawings. For example the poles and interpoles are conveniently secured to the coiled yoke 13 by countersunk screws (FIG. 5) and the bores in the coiled yoke 13 may be provided with reinforcing strips or washers to provide a compressive rather than tensile stress. The finished structure may be pressed so that the intermediate coils of the yoke 13 are joggled in such a way that the inside and outside surfaces are more nearly cylindrical or more nearly equi-angular plain faces as the case may be.

The application of adhesive material to the magnetic material need not be achieved prior to coiling on the mandrel 1. For example, if the coils of the yoke 13 are held slightly spaced apart entry of liquid adhesive can be achieved by capillary action. The spacing apart of the coils may be achieved by coating micron sized granules of uncrushable material on one surface of the magnetic material when in strip form. The coating may be undertaken by electrostatic spray to obtain uniform distribution of the particles.

The production of the slits 11 may be by a pressing operation or by a radiation beam cutting process. For example, the cutting process may be carried out by a suitably high powered laser which is scanned across the strip material during movement thereof in order to produce the desired slit pattern. Conveniently, the slits are only a few thousandths of an inch in width and in the range 1-2 inches in length, the spacing between adjacent slits being of the order 40-80 thousandths of an inch.

There has thus been described an electric motor structure which in large measure combines the electrical benefits of a stacked-laminate yoke with the cheapness and ease of manufacture of a solid yoke. The coiled yoke of the present invention acts both as a magnetic circuit element and as a monolithic structural element of the motor.

I claim:

1. An electric motor comprising;
    (a) rotor having a rotor shaft;
    (b) a stator, said stator comprising an annularly shaped yoke having an opening therethrough for receiving said rotor, said yoke consisting of a continuous metal strip wound in a spiral coil having consecutive convolutions, an adhesive having electrically insulating properties and disposed within said convolutions of said coil to form an electrical path for the conduction of magnetic flux and a mechanically self-supporting structure, and a plurality of pole assemblies secured to said self-supporting structure to extend into said opening; and
    (c) at least one end member, said one end member being supported by said self-supporting structure at an end of said yoke for mounting a bearing for rotatively receiving said rotor shaft.

2. The electric motor as claimed in claim 1, wherein each convolution of said spiral coil is provided with sets of slits therethrough, each of said slits extending circumferentially of said yoke, each of said sets of said slits comprising a number of parallel slits mutually spaced axially of said yoke, said sets of slits being located at the attachment points of selected of said plurality of pole assemblies to said self-supporting structure.

* * * * *